Figure 1:
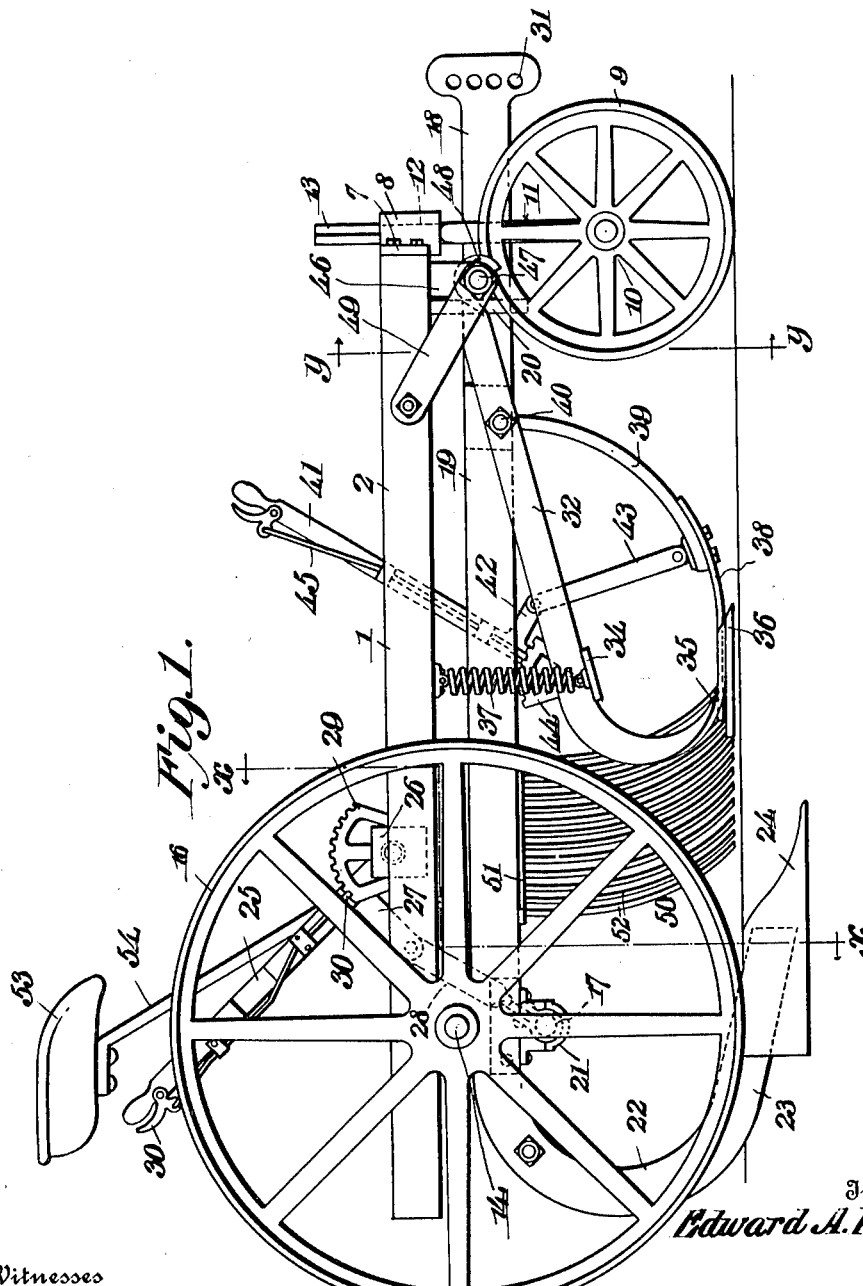

E. A. RASEY.
BEET HARVESTING MACHINE.
APPLICATION FILED MAR. 4, 1912.

1,071,794.

Patented Sept. 2, 1913.

3 SHEETS—SHEET 1.

Witnesses

Inventor
Edward A. Rasey.

By

Attorney

E. A. RASEY.
BEET HARVESTING MACHINE.
APPLICATION FILED MAR. 4, 1912.

1,071,794.

Patented Sept. 2, 1913.
3 SHEETS—SHEET 2.

Witnesses
L. B. Galt.
H. S. Austin.

Inventor
Edward A. Rasey.

By Joshua R. H. Potts
Attorney

E. A. RASEY.
BEET HARVESTING MACHINE.
APPLICATION FILED MAR. 4, 1912.

1,071,794.

Patented Sept. 2, 1913.

3 SHEETS—SHEET 3.

Witnesses

Inventor
Edward A. Rasey.

By Joshua R. H. Potts
Attorney

UNITED STATES PATENT OFFICE.

EDWARD A. RASEY, OF DENVER, COLORADO.

BEET-HARVESTING MACHINE.

1,071,794.   Specification of Letters Patent.   Patented Sept. 2, 1913.

Application filed March 4, 1912. Serial No. 681,566.

*To all whom it may concern:*

Be it known that I, EDWARD A. RASEY, a citizen of the United States, residing at Denver, county of Denver, and State of Colorado, have invented certain new and useful Improvements in Beet-Harvesting Machines, of which the following is a specification.

My invention relates to harvesters and particularly to beet harvesting machines.

The object of my invention is to provide an improved beet harvester which shall operate to sever the tops from the beets, throw the tops to one side of the row and dig the beets, leaving the beets on the surface of the ground and separated from the tops.

A further object of my invention is to provide a device of the class mentioned which shall cut the tops close to the crown of the beets, without injury to the beets, and irrespective of the irregularities in the ground or the uneven distances the beets may project above surface.

A further object is to provide in a beet harvester characterized as above mentioned, means for adjusting the device whereby it may be operated with an equal degree of accuracy upon beets having tops of various degrees of density.

Further objects of the invention are to provide a device as mentioned in which the pull of the draft members shall be directly to the plows or diggers and not transmitted indirectly thereto, and to provide the device with means for raising and lowering the operative parts.

Other objects will appear hereinafter.

With these objects in view my invention consists generally in a beet harvester comprising a frame mounted upon wheels, means for severing the tops from the beets, a device for gathering the severed tops and throwing the same to one side and means for raising the beets which have been topped from the ground, whereby the topped beets will be left upon the surface of the ground and separated from the severed tops.

My invention further consists of an improved beet topping device for a harvester, comprising a knife carrying frame hingedly mounted upon the frame of the harvester, a knife secured to the free end of the carrier frame, means for yieldably supporting the knife carrying ends of said frame and a shoe arranged upon said frame for bending the stalks of the tops and presenting them properly to the knife and also constituting means for raising the knife carrying frame and knife whereby the knife is caused to engage the stalks close to the crown irrespective of the irregularities in the surface of the ground and the various distances which the crowns of the beets may project from the ground.

My invention further consists in a topping device as above mentioned further characterized by means for adjusting the height of the shoe vertically with relation to the knife whereby the device may be adjusted to operate with precision upon beets having tops of various degrees of density.

My invention further consists in a harvester comprising a main frame mounted upon wheels, the rear axle being rotatably mounted in its bearings and provided between its bearings with a crank, an auxiliary frame connected adjacent its rear end to the crank and slidably mounted in bearings adjacent the forward end of the main frame, means for attaching draft gear to the forward end of the auxiliary frame, a plow upon the rear end of the auxiliary frame and means for turning the rear axle in its bearings.

My invention further consists in various details of construction and arrangements of parts all as will be fully described hereinafter and particularly pointed out in the claim.

My invention will be more readily understood by reference to the accompanying drawings forming a part of this specification and in which—

Figure 2:
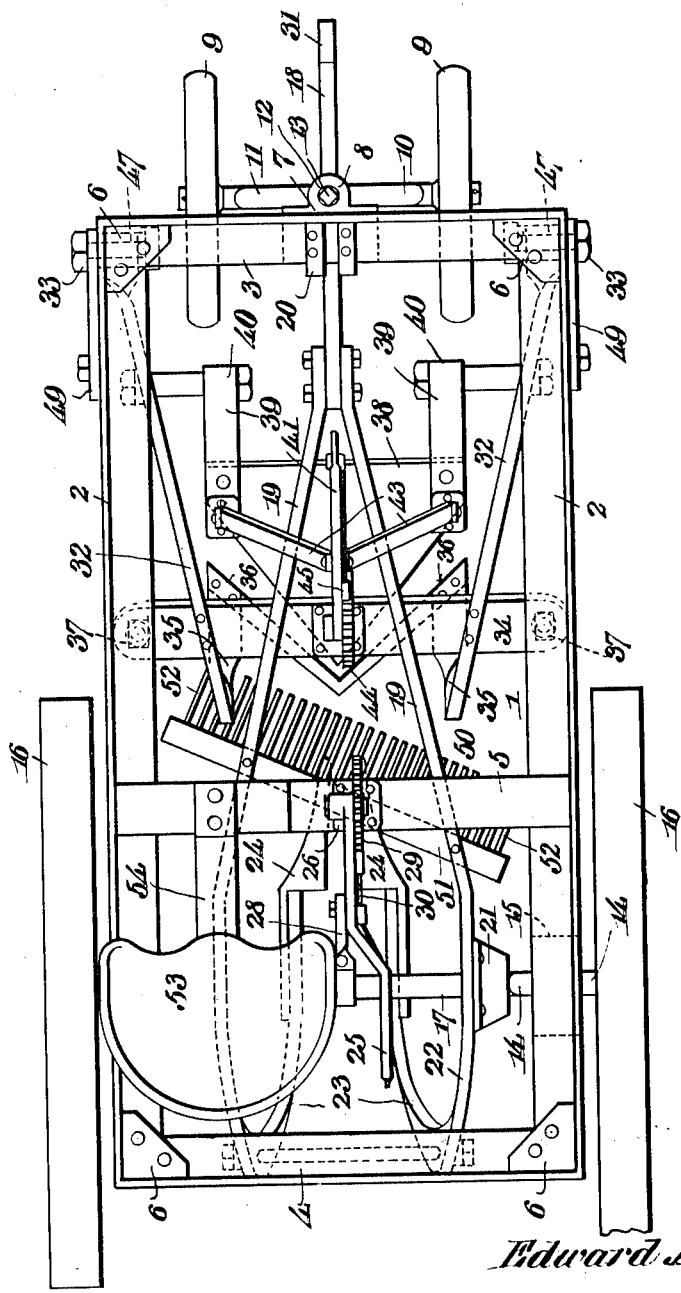
Figure 3:
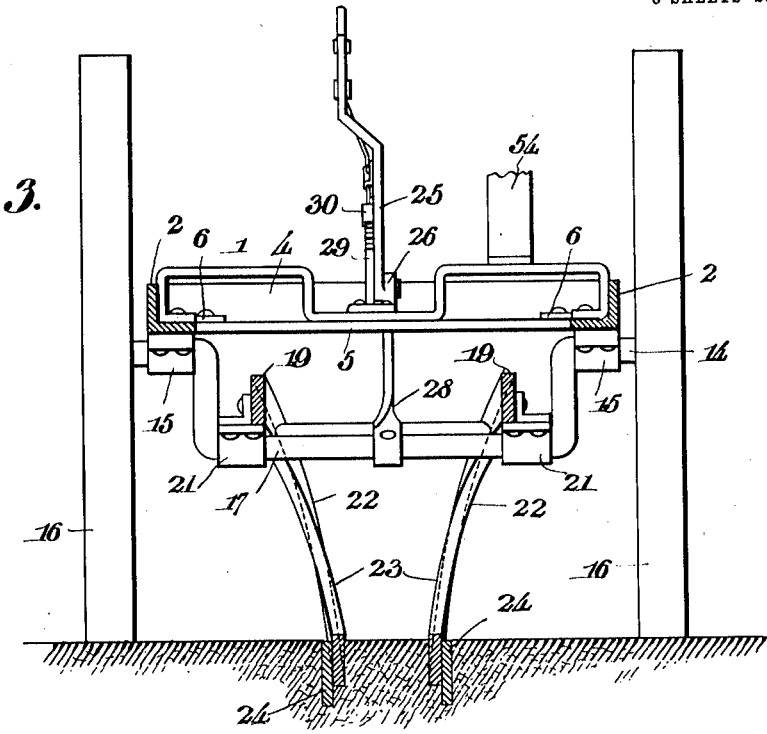
Figure 4:
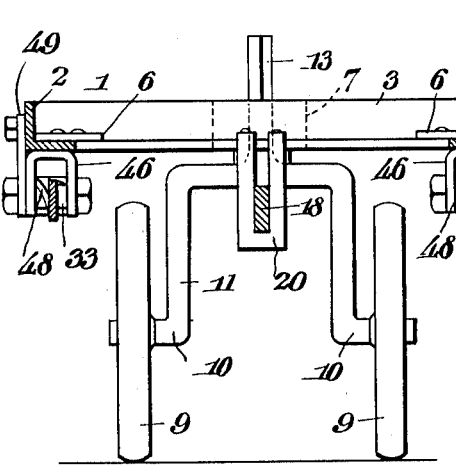
Figure 5:
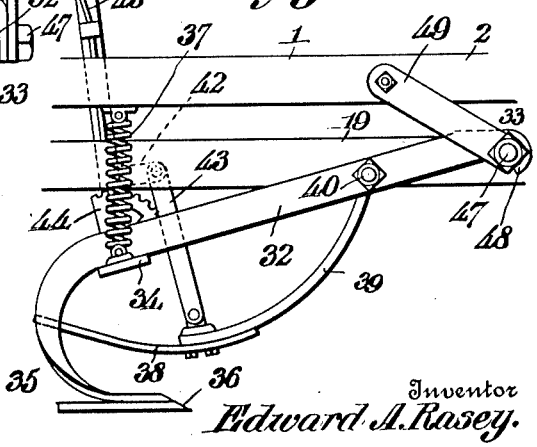

Figure 1 is a side elevation of a beet harvester embodying my invention in its preferred form, Fig. 2 is plan view of the same, Fig. 3 is a transverse section on substantially the line $x$—$x$ of Fig. 1, Fig. 4 is a similar section on the line $y$—$y$ of Fig. 1, and Fig. 5 is a detail of the topping mechanism.

Referring now to the drawings 1 indicates the main frame of the device which comprises the longitudinal side members 2—2, transverse end members 3 and 4 and an intermediate transverse member 5, the purpose of which will appear hereinafter. The frame members 2, 3 and 4 are preferably formed of angle bars as illustrated and are braced at the corners by gusset plates 6. Secured centrally to the transverse front frame member 3 is a bracket 7 provided with vertically disposed bearing 8 in which is mounted the member by means of which the front wheels of the device are pivotally connected to the frame.

9—9 indicate the front wheels which are sufficiently small to pass under the main frame 1 when turning, and 10 indicates the front axle which is arched as at 11 to extend upwardly at the center to the bearing 8. Rigidly fixed to the center of the axle 10 is a vertically disposed journal 12 mounted in the bearing 8. The journal 12 is provided with an upwardly extending squared portion 13 adapted to receive steering mechanism which is not shown in the drawing as the same may be of any preferred form and does not constitute an essential part of this invention.

14 indicates the rear axle which is mounted to oscillate in bearings 15 secured to the frame members 2 adjacent their rear ends. Rotatably mounted on the ends of the shaft 14 are large rear wheels 16. The axle 14 is off-set forming a crank 17 which extends substantially the full distance between the bearings 15, and the purpose of which will appear hereinafter.

The auxiliary frame comprises a draft bar 18 and a pair of diverging rearwardly extending bars 19 rigidly secured at their forward ends to the rear end of the draft bar. The draft bar is slidably mounted in a bracket 20 secured to the front transverse frame member 3 and depending from the center of the rear edge thereof, and the members 19 are provided with bearings 21 for the crank 17 formed on the rear axle. The auxiliary frame is thus supported by the bracket 20 and the crank 17. It should be noted that the members 19 extend over the crank 17 and rest thereon by which construction the bearings 21 are relieved of the strain incident to supporting the auxiliary frame. The rear ends of the members 19 curve downwardly and then forwardly as at 22 and 23 respectively and to the lower ends are secured shovels or plows 24 for raising the beets from the ground. The curved rear ends of the members 19 converge downwardly in order to bring the shovels 24 into close proximity. As the auxiliary frame, which carries the shovels, is slidably supported in the bracket 20 and by the crank 17, it is obvious that by turning said crank the frame may be raised to lift the shovels from the ground, and suitable means are provided for this purpose. To this end I provide a lever 25 pivotally supported in brackets 26 on the transverse frame member 5 and connect this lever by suitable means with the crank 17 of the rear axle whereby throwing the lever will turn said crank and raise the auxiliary frame. As shown in the drawings the lever 25 is provided near its lower end with an arm 27 which is connected by a link 28 with the crank 17.

29 indicates a quadrant and 30 the latch mechanism on the lever for engaging the quadrant to hold the auxiliary frame in the desired position. The forward end of the bar 18 is provided with means 31 for attaching suitable draft gear, and it should be noted that the draft gear is attached directly to the auxiliary or shovel supporting frame whereby the main frame is relieved of the greater portion of the strain.

The beet topping device comprises a frame hingedly connected to the main frame, a knife carried by said frame, a shoe arranged adjacent the knife and means for yieldingly supporting the free or knife carrying end of said frame. The frame comprises a pair of bars 32 hingedly mounted at their forward ends upon suitable bearings 33 on the main frame and a transverse bar 34 connecting the same adjacent their free ends. The bars 32 preferably converge rearwardly and their rear or free ends curve downwardly and forwardly. To the lower forwardly extending ends 35 is secured the knife 36 which is preferably V-shaped as shown to insure properly cutting the stalks. The bar 34 extends substantially the full width of the device with its ends beneath the side members 2 of the main frame and interposed between the members 2 and the ends of the bar 34 are springs 37 by means of which the knife carrying end of the frame is yieldingly supported.

The shoe comprises a curved plate 38 arranged adjacent, in front of and somewhat above the knife 36, and is mounted upon a pair of arms 39 which are pivotally secured as at 40 to the members 32 of the knife carrying frame. While the device is in operation the shoe is held in fixed relation to the knife whereby any obstruction or unevenness engaging the curved face of the shoe will raise the knife carrying frame and the knife. As the shoe passes over the beet tops it bends them over so as to present the stalks in proper position for the knife, but as the stalks or tops may vary in density and resistance to bending it is obvious that means must be provided to adjust the position of the shoe vertically with relation to the knife in order to insure the knife cutting the stalks close to the crown of the beets. Pivotally mounted on the bar 34 is a lever 41 having a forwardly extending arm 42 which is connected by links 43 with the shoe. By throwing the lever 41 the shoe may be raised or lowered as found necessary.

44 indicates a quadrant and 45 the latch mechanism for holding the lever in proper position.

The bars 32 of the main frame are preferably flat and arranged upon edge, and their forward ends are twisted at right angles to the body portion and then bent into cylindrical form to engage the bearings 33. The bearings comprise a U-shaped bracket 46 depending from the forward corners of the main frame 1 and a transverse bolt 47 extending therethrough which is engaged by the bent end 48 of the members 32. The rear lower ends 35 are also twisted at right angles to the plane of the body portion to facilitate securing the blade thereto.

49 indicates a brace bar for the bracket 46.

Arranged directly behind the knife is an obliquely disposed rake 50 which comprises a bar 51 fixed to the members 19 of the auxiliary frame and a plurality of curved tines 52. By arranging the rake as described, the severed tops are gathered and deposited at one side of the row before the beets are raised from the ground.

53 indicates the seat supported by a bar 54 secured at its lower end to the transverse member 5, and so arranged that the levers 25 and 41 are within easy reach of the operator.

The operation of the device having been explained with the description of the machine, further description thereof is unnecessary.

Having described my invention what I claim as new and desire to secure by Letters Patent is:—

In a harvester, a main frame mounted upon wheels, a knife carrying frame comprising a pair of bars hingedly connected at one end to said main frame and a transverse bar adjacent the opposite end, yielding supports interposed between said main frame and said transverse bar, a knife fixed to the free end of said knife carrying frame, and a shoe on said frame adjacent said knife, substantially as described.

In testimony whereof I have signed my name to this specification in the presence of two subscribing witnesses.

EDWARD A. RASEY.

Witnesses:
Lewis S. Snapp,
Elbridge G. Chapman.